UNITED STATES PATENT OFFICE.

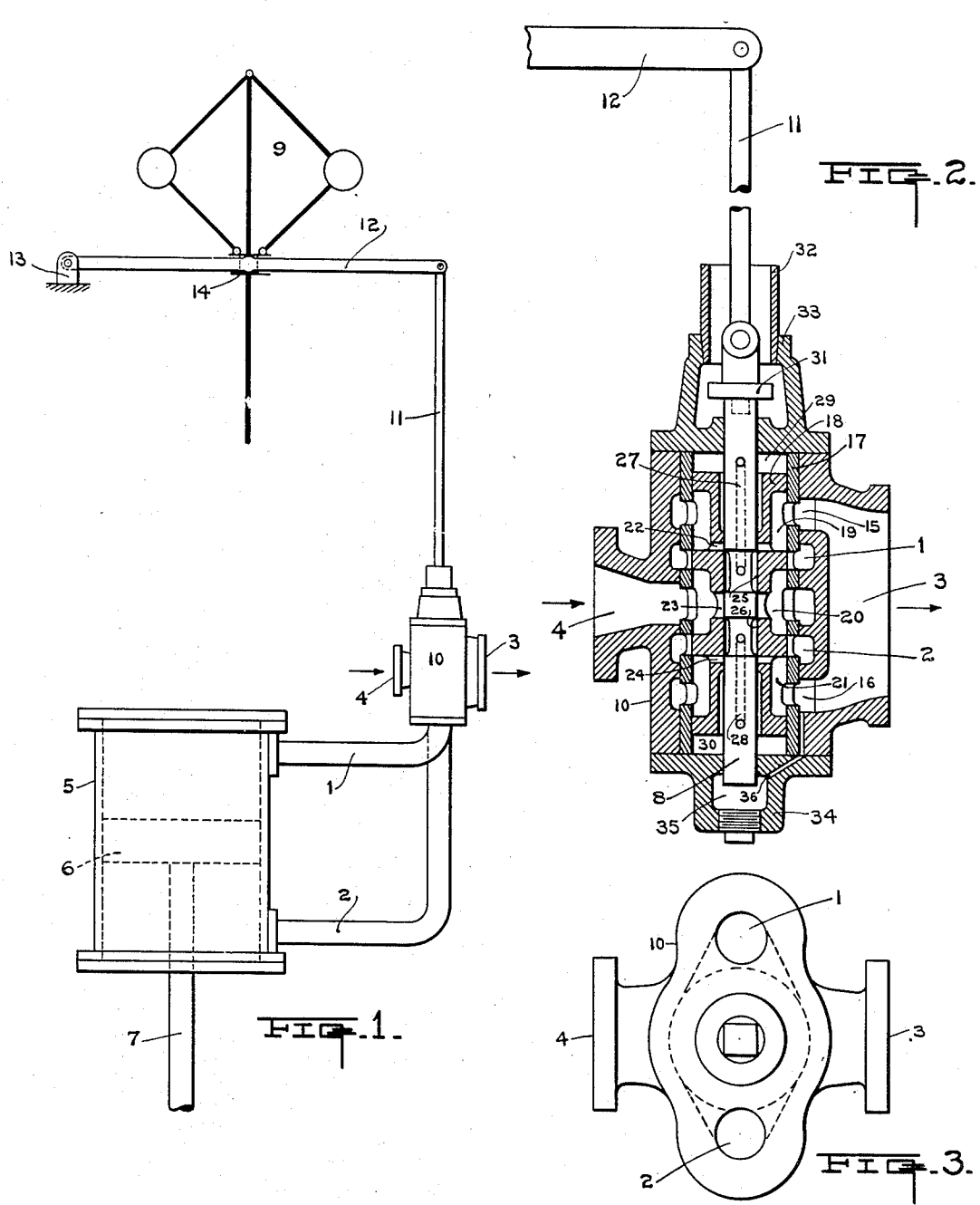

JOHN ELOV ENGLESSON, OF KARLSKRONA, SWEDEN, ASSIGNOR, BY MESNE ASSIGNMENTS, TO ALLIS-CHALMERS MANUFACTURING COMPANY, A CORPORATION OF DELAWARE.

DISTRIBUTING-VALVE.

1,125,825.  Specification of Letters Patent.  Patented Jan. 19, 1915.

Application filed June 27, 1912. Serial No. 706,311.

*To all whom it may concern:*

Be it known that I, JOHN ELOV ENGLESSON, a subject of the King of Sweden, residing at Karlskrona, Sweden, have invented a certain new and useful Improvement in Distributing-Valves, of which the following is a specification.

This invention relates to distributing valves in which there is a main valve and a pilot valve, the main valve controlling the distribution of fluid to and from a distributing conduit, and the pilot valve controlling and effecting the flow of fluid to and from the ends of the main valve. The work of the pilot valve is only to cause the main valve to be actuated so as to effect the distribution of the fluid to the distributing conduit. The power required to operate the pilot valve is therefore insignificant as compared with the power required to operate the main valve. This being true, the pilot valve is easily operable from a limited source of power, such as a governor.

The invention is applicable to many situations in which a weak controlling power is available and where the power required to move the main valve is considerable.

The object of the invention is to provide a valve of this kind which is efficient and reliable in operation and one in which the pilot valve is easily removable for inspection, and the passages requiring such inspection are located directly in the structure of the pilot valve.

One embodiment of the invention may be had by applying same to a speed governor control of a liquid operated servo-motor, and the same is illustrated in the accompanying drawing in which—

Figure 1 is a side elevation of a general application of the invention. Fig. 2 is a central vertical section through the valve, showing part of the operating connection, and Fig. 3 is an inverted plan view of the valve casing.

Referring to the drawing, especially to Fig. 1 thereof, a servo-motor cylinder 5 has a piston 6 and piston rod 7 which may be connected to the main valve of any prime mover. The pipes connecting to the ends of cylinder 5 form conduits 1, 2, extending into the valve casing 10. The valve casing 10 also has a supply pipe 4 and a final discharge 3. A stem 11 of a pilot valve 8 extends upwardly from the valve casing 10 and pivotally connects a lever 12 pivotally connected at its other end to a support 13. Intermediate its ends the lever 12 is pivotally connected to the collar 14 of a speed responsive device, as flyball 9.

Referring more specifically to Figs. 2 and 3 of the drawing, the distributing conduits 1, 2, terminate annularly in the valve casing 10. The final discharge 3 connects with annular discharge channels 15, 16. The supply pipe 4 terminates annularly in the valve casing 10. The relative location of these annular spaces within the casing is such that the supply pipe annular space is central; the annular spaces of the distributing conduits 1, 2, are located adjacent this central annular space of the supply pipe, and the annular discharge channels 15, 16, lie beyond the annular distributing conduits 1, 2. For convenience of manufacture and repair, a bushing 17 is fitted to the main longitudinal bore in valve casing 10 and connects by suitable porting with the several annular spaces hereinbefore referred to. The bushing 17 is longitudinally bored throughout its length and a piston valve 18 is ground to accurately fit the bore of the bushing 17. This piston valve is formed with three grooves 19, 20, 21, connecting with a longitudinal bore through the piston valve by suitable ports 22, 23, 24. The pilot valve 8 fits within the longitudinal bore of the piston valve 18 and is formed with grooves 25, 26. Internal passages 27, 28, are formed in said pilot valve and connect the grooves 25, 26, respectively to the spaces 29, 30, at the ends of the piston valve 18. These internal passages 27, 28, are formed in the pilot valve 8, preferably by longitudinal boring into each end of the pilot valve and then by lateral boring therethrough to connect this longitudinal bore to the outside, after which the free ends of the longitudinal bores are plugged; or these internal passages may formed by being cored in, if the pilot valve 8 is made by casting. The pilot valve is preferably formed at its upper end with a collar 31 which after a sleeve 32 is screwed into place in the upper end of the upper cap 33 of the valve casing 28, prevents the pilot valve from being withdrawn from the valve casing 10. The lower cap 34 of the valve casing 10 is formed with a balancing chamber 35 into which the pilot valve 8 extends and which is connected by a suitable port 36 to the final discharge 3.

The operation is as follows: Assuming that the speed responsive device, the flyball 9, raises pilot valve 8, fluid pressure will be admitted through supply pipe 4, its annular terminal space, the corresponding ports through bushing 17, the groove 20 and the port 23 in the piston valve 18, the groove 26 and the internal passage 28 in the pilot valve 8 to the space 30 at the lower end of the piston valve 18. At the same time the fluid in the space 29 at the upper end of piston valve 18 will be exhausted through internal passage 27 and groove 25 in the pilot valve 8, through port 22 and groove 19 in the piston valve 18, through the port in the bushing 17 corresponding to the annular discharge channel 15, and through said channel 15 to the final discharge 3. The piston valve 18 will therefore be moved upwardly by reason of this pressure established at its lower end and the decrease in pressure effected at its upper end, thereby establishing communication between distributing conduit 1 and the annular terminal of the supply pipe 4 through the middle groove 20 in the piston valve 18; and also establishing communication between the distributing conduit 2 and the discharge channel 16 through the lower groove 21 of piston valve 18. The result will be that piston 6 will be moved downwardly because pressure will have been established above same while the space in the cylinder 5 below same will be connected to the exhaust. It will be clear that a reverse sequence of operating conditions will follow the lowering of the pilot valve 8, namely, whereby the distributing conduit 2 will be placed in communication with the annular terminal of the supply pipe 4 through the central groove 20 in the piston valve 18 and the distributing conduit 1 will be placed in communication with the annular discharge channel 15 through the upper groove 19 in the piston valve 18. In that case the piston 6 will be moved upwardly.

It will be seen that by means of this invention the pilot valve 8 may be easily and quickly removed for inspection and cleaning of the internal passages 27, 28, by unscrewing the sleeve 32.

It should be understood that it is not desired to be limited to the exact details of construction shown and described, for obvious modifications will occur to a person skilled in the art.

It is claimed and desired to secure by Letters Patent,—

A distributing valve comprising a valve casing forming a chamber, a supply conduit connecting with said chamber, discharge conduits connecting with said chamber on opposite sides of the connection of said supply conduit therewith, distributing conduits connecting with said chamber at points intermediate the connections of said supply and said discharge conduits therewith, a piston valve shiftable within said chamber, and a shiftable pilot valve within said piston valve and having grooves, and internal passages connecting said grooves freely and directly with the portions of said chamber at the ends of said piston valve.

In testimony whereof I have affixed my signature in the presence of two witnesses.

J. ELOV ENGLESSON.

Witnesses:
CHAS. L. BYRON,
W. H. LIEBER.